(12) United States Patent
Tendron et al.

(10) Patent No.: US 11,133,655 B2
(45) Date of Patent: Sep. 28, 2021

(54) PROTECTIVE SHEATH IN PARTICULAR INTENDED FOR HOUSING ELECTRICAL CABLES

(71) Applicant: SAFRAN AEROSYSTEMS, Plaisir (FR)

(72) Inventors: Yohan Tendron, Ballan-Mire (FR); Eric Pestel, Tours (FR)

(73) Assignee: SAFRAN AEROSYSTEMS, Plaisir (FR)

(*) Notice: Subject to any disclaimer, the term of this patent is extended or adjusted under 35 U.S.C. 154(b) by 246 days.

(21) Appl. No.: 16/343,290

(22) PCT Filed: Oct. 18, 2016

(86) PCT No.: PCT/FR2016/052695
§ 371 (c)(1),
(2) Date: Apr. 18, 2019

(87) PCT Pub. No.: WO2018/073497
PCT Pub. Date: Apr. 26, 2018

(65) Prior Publication Data
US 2019/0260192 A1    Aug. 22, 2019

(51) Int. Cl.
*D04B 21/00* (2006.01)
*D04B 21/10* (2006.01)
*H02G 3/04* (2006.01)

(52) U.S. Cl.
CPC ........... *H02G 3/0406* (2013.01); *D04B 21/00* (2013.01); *D04B 21/10* (2013.01); *H02G 3/0462* (2013.01);
(Continued)

(58) Field of Classification Search
CPC .. H02G 3/0406; H02G 3/0462; H02G 3/0481; D04B 21/00; D04B 21/10; D10B 2505/12
(Continued)

(56) References Cited

U.S. PATENT DOCUMENTS

| | | | |
|---|---|---|---|
| 5,843,542 A | 12/1998 | Brushafer et al. | |
| 6,840,066 B2* | 1/2005 | Dickerson | D04B 21/18 66/192 |

(Continued)

FOREIGN PATENT DOCUMENTS

| | | |
|---|---|---|
| EP | 2 918 539 A1 | 9/2015 |
| FR | 3 008 433 A1 | 1/2015 |
| FR | 3 035 276 A1 | 10/2016 |

OTHER PUBLICATIONS

International Search Report dated Jun. 21, 2017, issued in corresponding International Application No. PCT/FR2016/052695, filed Oct. 18, 2016, 6 pages.

*Primary Examiner* — Timothy J Thompson
*Assistant Examiner* — Michael F McAllister
(74) *Attorney, Agent, or Firm* — Christensen O'Connor Johnson Kindness PLLC

(57) ABSTRACT

The invention relates to a protective sheath designed, in particular but not exclusively, for an aircraft. The conduit is flexible and can have a small radius of curvature able to be obtained without torsion and allowing access, over the majority or entirety of its length, to the electrical wire or cable inside. The protective sheath (1) comprises a flexible body generally having a cylindrical shape, the flexible body being slit along at least a certain length and along a longitudinal axis, characterised in that the body has an open-work wall and in that the sheath is capable of being deformed along its length in order to be compressed/compacted on itself.

11 Claims, 1 Drawing Sheet

(52) U.S. Cl.
CPC ....... *H02G 3/0481* (2013.01); *D10B 2505/12* (2013.01)

(58) Field of Classification Search
USPC .......................................... 174/68.1
See application file for complete search history.

(56) References Cited

U.S. PATENT DOCUMENTS

| | | | | |
|---|---|---|---|---|
| 6,984,592 | B2* | 1/2006 | Vaartstra | C23C 16/40 |
| | | | | 257/E21.247 |
| 8,925,592 | B2* | 1/2015 | Itoh | D03D 1/0043 |
| | | | | 139/384 R |
| 9,347,158 | B2* | 5/2016 | Cabouillet | D03D 1/0035 |
| 9,909,237 | B2* | 3/2018 | Woodruff | D03D 13/00 |
| 10,208,410 | B2* | 2/2019 | Gao | D04C 1/02 |
| 10,357,933 | B2* | 7/2019 | Malloy | B32B 1/08 |
| 10,870,931 | B2* | 12/2020 | Morris | D03D 13/004 |
| 2003/0044155 | A1* | 3/2003 | Maiden | D03D 3/02 |
| | | | | 385/137 |
| 2005/0124249 | A1* | 6/2005 | Uribarri | D03D 1/0043 |
| | | | | 442/304 |
| 2006/0281382 | A1* | 12/2006 | Karayianni | D04B 1/14 |
| | | | | 442/181 |
| 2007/0163305 | A1* | 7/2007 | Baer | D04B 21/16 |
| | | | | 66/171 |
| 2008/0135119 | A1* | 6/2008 | Tonooka | D03D 1/0043 |
| | | | | 138/110 |
| 2011/0083879 | A1* | 4/2011 | Avula | D03D 1/0043 |
| | | | | 174/136 |
| 2014/0272224 | A1* | 9/2014 | Cabouillet | H02G 3/0481 |
| | | | | 428/36.1 |
| 2014/0273699 | A1* | 9/2014 | Zhang | F16L 53/38 |
| | | | | 442/316 |
| 2015/0176162 | A1* | 6/2015 | Relats Manent | D04B 21/16 |
| | | | | 66/195 |
| 2015/0233029 | A1* | 8/2015 | Woodruff | D04B 21/14 |
| | | | | 428/34.1 |
| 2016/0024697 | A1* | 1/2016 | Cabouillet | D04B 21/165 |
| | | | | 66/190 |

* cited by examiner

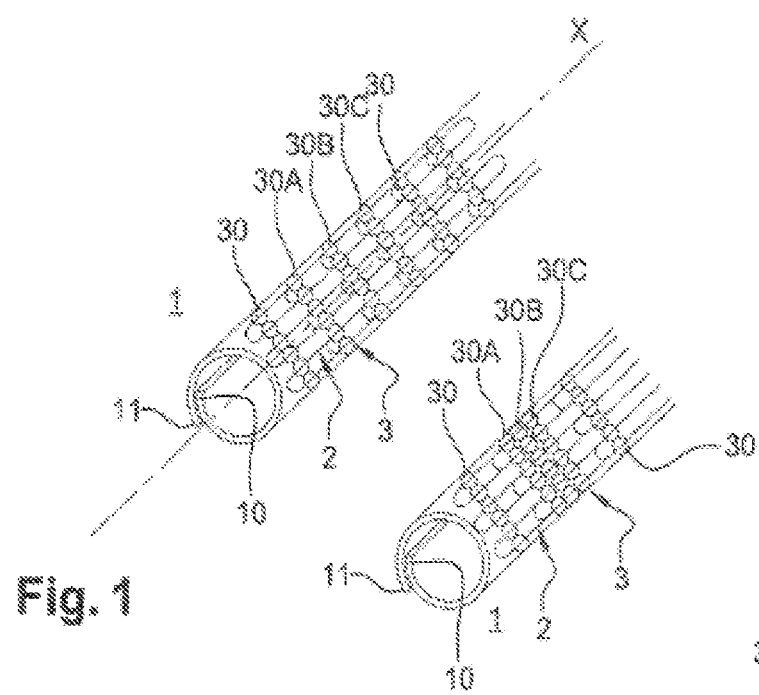
Fig. 1
Fig. 2
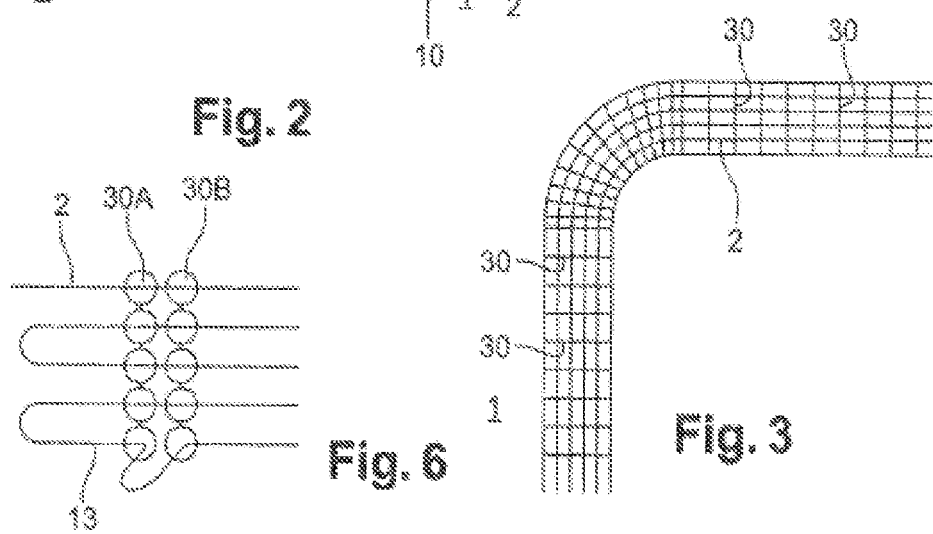
Fig. 6
Fig. 3
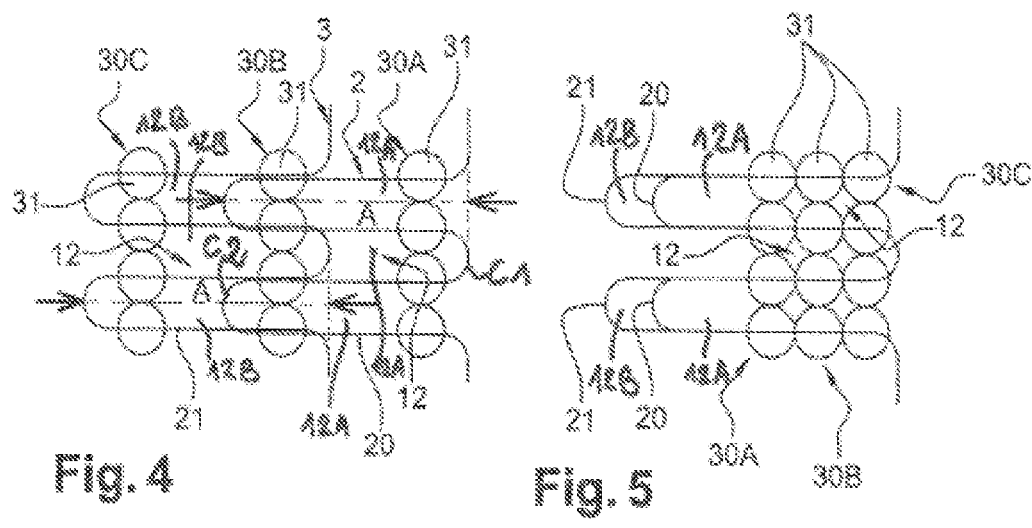
Fig. 4
Fig. 5

PROTECTIVE SHEATH IN PARTICULAR INTENDED FOR HOUSING ELECTRICAL CABLES

CROSS-REFERENCE TO RELATED APPLICATIONS

This application is a National Stage of PCT/FR2016/052695, filed Oct. 18, 2016, the disclosure of which is expressly incorporated herein by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not applicable

BACKGROUND OF THE INVENTION

The present invention relates to a protective sheath used in particular, but not exclusively, to receive electrical wires/cables, and relates more particularly to a sheath whose body is open/slit over at least a part of its length.

FIELD OF THE INVENTION

The invention will be described more particularly with respect to a protective sheath intended to receive electrical wires/cables, but without being limited thereto.

BRIEF SUMMARY OF THE INVENTION

The sheaths protecting electrical cable bundles are used in many fields, such as the aeronautical, aerospace, automobile and other industries, so as to run bundles of cables conveying electrical signals in total safety.

The sheaths are highly diverse according to the field of application and the type of protection demanded (for example mechanical and/or electrical protection).

Protective sheaths are known that are made of relatively rigid plastic material such as PTFE, closed over their length and generally ribbed or splined. However, their bending radius is relatively great, which complicates their installation in some restricted spaces. Furthermore, as soon as an electrical wire or a cable is introduced into the conduit, it is accessible only at the ends of the sheath.

To provide smaller bending radii, sheaths made of fabric have been proposed, that are open over their length while having a zone of overlap for them to be closed. The closure is essential to ensure the protection of the cables housed inside.

These sheaths, by virtue of their fabric material, are capable of being kinked by being twisted on themselves along their length. They are precisely twisted on themselves during their installation to avoid the separation and the opening thereof at right angles to their longitudinal body once the cables are housed therein. The twisting does not allow the reopening of the sheath over time.

Furthermore, such a sheath, by virtue of its longitudinal opening, makes it possible to access the electrical wires or the cables introduced at any point over its length.

The present invention targets an alternative solution to a twisted fabric sheath to provide a flexible sheath, providing, when needed, small bending radii, giving access to the electrical wires or to the cables housed inside over its length at all points, while minimizing its weight. The sheath of the invention does not require a twisting of the sheath for its installation in order to keep it closed.

According to the invention, the sheath comprises a flexible body having, generally, the form of a cylinder, the flexible body being slit along at least a certain length and along a longitudinal axis, and is characterized in that the body has an openwork wall and in that the sheath is capable of being deformed along its length to be compressed/compacted on itself.

The terms "compressed", "compacted" should be understood to be the qualifier relating to the sheath such that, by considering a rectilinear part of the sheath with an initial length, this rectilinear part has, once compressed in its longitudinal direction, a shorter length, but without loss of material. The sheath comprises the same quantity of material once compressed, the material being, by contrast, locally compacted.

The sheath is openwork having a multitude of meshes. Once compressed, the coverage factor of the sheath is modified. Thus, in the locally compressed part, the sheath is less openwork; the meshes are closer together.

The sheath exhibits an accordion-like flexibility in its longitudinal direction in order to locally impose a bunching of material to make it possible to bend the sheath at this point or in immediate proximity.

This compressed state is obtained by exerting a pushing force on the sheath in its longitudinal direction. More specifically, the operator grasps the sheath on either side of the point where the compressed state is desired, by holding the sheath fixed on one side, he or she exerts on the opposite side a pushing force of longitudinal direction on the sheath and towards the side held fixed, which causes the material to be compacted on itself.

This sheath configuration very easily allows the operator to install the sheath around the cables to be protected. When the sheath is bent, it exhibits a bunching of material in the inner radius of the bend and is capable of being extended on the outer radius of this bend, which makes it possible to produce bends with small, even very small, radii, both in the compressed state and in the extended state.

The protective sheath can therefore follow any run in the space which is dedicated to it, follow outlines with great then very small bending radii established in immediate proximity, and therefore adapt to any type of profile. Whatever the profile imposed on the sheath, the latter remains closed on itself, without risk of opening.

Furthermore, its openwork configuration makes it possible to minimize its weight.

According to one feature, the sheath is capable of keeping its compressed state without the presence of added maintaining means. Through its configuration, once in the compressed state, the operator does not need to exert or maintain a compression or pushing force.

The operation of holding the sheath on one side and pushing from the other side is simple and quick to implement. The installer does not, as for example in the prior art, have to exert a twisting operation. The sheath of the invention is not kinked.

According to another feature, the sheath, after having been compressed, is capable of regaining its initial length or of being brought to an intermediate length while retaining a compressed state to correspond to the desired length. In this respect, the sheath is intended to be stretched in its longitudinal direction, by exerting a pulling force in the longitudinal direction of the sheath.

Advantageously, the sheath is capable of being fixed in its compressed state, that is to say, once locally compressed, it can no longer overlap its initial state or be stretched longitudinally/redeployed. The operation which is imposed on the sheath will be described later.

Thus, the sheath of the invention, by virtue of its flexibility, the fact that its wall is openwork and its capability of being compressed, provides it with the combined faculties of lightness, of flexibility and of maintaining its form so as to be able to impose on it a specific profile which will correspond to the outline of the run that the sheath will have to follow in its use, while providing, when necessary, for all kinds of bending radii, including very small, while remaining closed on itself.

The modularity of the length of the sheath can be produced without damaging the body of the sheath with respect to its protection function, that is to say that the body of the sheath keeps its protective function for the cables intended to be housed inside said body.

Furthermore, once reduced in length, the body of the sheath remains in the imposed configuration without the diameter/the cylindrical section of the internal passage being altered.

Moreover, by modulating the length of the sheath, in particular by compressing it, the material is then compacted on itself, compressing the openwork portions against one another, which forms a tighter-packed zone so as to obtain a portion that is virtually sealed.

Consequently, the openwork sheath of the invention and its capacity to be retracted modifies its coverage factor. In the compressed places, the meshes being tighter together, the material is locally increased, which increases the abrasion-resistance capability. That makes it possible, in the compressed places, to arrange sheath fixing accessories in the environment of its installation, without the risk of damaging the cables that it protects.

Furthermore, the open-working of the wall makes it possible, depending on the application targeted for the sheath, to drain liquids through its body.

Furthermore, the reversibility from its compressed state to its elongate/deployed state makes it possible, when installing the sheath, to revert at any moment to an intermediate length or to the initial length if necessary.

However, it is also possible, if necessary, to fix the sheath at a desired point in its compressed state.

Finally, the longitudinal slit of the sheath makes it possible to open it to house or access cables therein at any time; the sheath does not have to undergo twisting to remain closed after it has been opened, unlike a fabric sheath of the prior art with slit and twisted body. Moreover, the sheath of the invention retains a circular cross section.

According to the invention, the sheath retains its form when a corner is imposed on it, that is to say when the installer imposes a bend, a bent profile on the sheath. This bending angle (radius taken on the inner edge of the sheath) can range to a minimum of two times the sheath diameter without altering the diameter of the sheath and without opening the overlap.

The sheath of the present invention has a cylindrical body which is open/slit along a longitudinal axis. The sheath is closed by being overlapped on itself.

Advantageously, the flexible wall overlaps to form a region of overlap, preferably the overlap corresponding to an angle of at most 130°, in particular between 65 and 130°, in particular between and 70° and 110°. This overlap enhances the keeping of the duct in the closed position. The region of overlap thus has twice the thickness of other regions, because it comprises two contiguous layers of material.

The sheath comprises a multiplicity of meshes/orifices which can be modulated lengthwise parallel to the longitudinal body of the sheath.

The modularity of the size of the meshes is obtained by compression or traction of the sheath in the longitudinal direction of its body, in particular manually without tools.

The sheath is advantageously made from knitted threads. The sheath has been manufactured by knitting and not by a weaving operation.

The sheath comprises threads forming a mesh, preferably the meshes in the free (noncompressed) state delimiting holes of the order of between 3 and 80 $mm^2$.

The sheath comprises at least two threads, at least one thread, called framework thread, extending in the longitudinal direction of the sheath, and preferably having a profile substantially in the form of a plurality of sinusoids, the sinusoids extending transversely to the longitudinal direction, and at least one other thread, called transverse thread, extending transversely to the longitudinal direction in the form of a plurality of lines transversal to the longitudinal axis of the sheath and spaced apart from one another when the sheath is not in a compressed state.

The sinusoids of the framework thread form a multitude of sinusoids spaced apart and parallel to one another, each sinusoid extending from one longitudinal edge to the opposite longitudinal edge of the sheath, and doing so over all the length of the sheath.

The association of the transverse thread with the framework thread is produced by the knitting of the transverse thread with the framework thread, the transverse thread comprising patterns or loops, preferably in pillar stitch pattern, in which the framework thread runs, the loops forming lines transversal to the longitudinal body of the sheath, and spaced apart from one another, which makes it possible to produce a sheath comprising a multitude of meshes.

More particularly, the transverse thread has a repetitive pattern in the form of loops or of a pillar stitch pattern, and said transverse thread is associated with the framework thread in such a way that the transverse thread forms lines spaced apart transversal to the longitudinal body of the sheath, the framework thread forming, between two transverse lines of the transverse thread, a single sinusoid extending transversely to the longitudinal body of the sheath, each crest of the sinusoid passing into the repetitive pattern of two transverse lines of the transverse thread, so that the sheath has, between two transverse lines of the transverse thread, a plurality of unitary meshes adjacent to one another in a direction transversal to the longitudinal body of the sheath.

"Unitary mesh" of the framework thread should be understood to mean the presence in the longitudinal direction of a single mesh between two transverse lines of the transverse thread. Because there is only a single sinusoid between two transverse lines of the transverse thread, that creates a plurality of unitary meshes arranged alongside one another in the transverse direction to form the width of the sheath, that is to say to form the circumference of the sheath.

Thus, the cooperation of the framework thread with the patterns (loops or pillar stitches) of the transverse thread and the spacing of the transverse lines provide a multiplicity of (unitary) meshes in the transverse direction, the framework thread being able to be held in two consecutive or non-consecutive transverse lines of the transverse thread.

The framework thread forms, with two transverse lines of the transverse thread, a single sinusoid creating unitary meshes between said two transverse lines, the unitary meshes being arranged alongside one another in the direction transversal to the longitudinal direction of the sheath.

The fact that the transverse lines of the transverse thread are linked only by a single mesh allows the loop of the sinusoid of each mesh to slide in the loop of the adjacent sinusoid which is arranged on the other side of a transverse line of the transverse thread. A sinusoid of the transverse thread linking two transverse lines of the transverse thread is capable of sliding without being nested in the adjacent sinusoid linking two other transverse lines of the transverse thread.

The meshes which are aligned in the longitudinal direction of the sheath are capable of sliding longitudinally to be nested in one another. The nesting in one another of the meshes aligned in the longitudinal direction causes the transverse lines to come closer together until, if necessary, the transverse lines abut with one another if the sheath has to be strongly and locally compressed.

The meshes of the sheath are capable of being tightened because the sinusoids of the framework thread are capable of being nested in one another in the longitudinal direction of the sheath, then bringing at least two consecutive lines of the transverse thread closer together.

Each loop of the transverse thread forms a pattern, for example of pillar stitch type.

The sheath preferably comprises a single continuous framework thread over all the length of the sheath, to facilitate the production. As a variant, the sheath can comprise several framework threads.

The sheath can comprise a single transverse thread or several to form the transverse lines of loops.

The sheath comprises several threads made of flexible, supple material, preferably based on plastic material.

Hereinafter in the description, "thread" should be understood to mean a (continuous) single-strand or multi-stranded thread or a thread made of short or long fibers.

To fix the sheath in a compressed state, the framework thread advantageously has, on a longitudinal edge of the sheath, the one arranged on the outside, an outwardly-extending end on which it is possible to pull. By pulling on the thread, that tightens the loops of two consecutive lines of the transverse thread and, at this point, pinches the framework thread. In this local compressed part, the sheath can no longer be deployed.

The material of the sheath (of the threads) is for example chosen from the following materials, possibly in combination: polymers of polyamide (PA), para-aramid (PPTA), meta-aramid (PMMA), polypropylene (PP), polyoxymethylene (POM), polyethyletherketone (PEEK), polyester, polysulfone (PSU), polyphenylenesulfide (PPS), polyimide (PI), polyamide-imide (PAI), polyvinylidenefluoride (PVDF), polyaryletherketone (PAEK), polyetherimide (PEI), PTFE (polytetrafluoroethylene) type.

The framework thread and the transverse thread can be made from a material exhibiting the same flexibility. The framework thread and the transverse thread must be at least composed of a single strand making it possible to confer a sufficient rigidity on the sheath to maintain the compression.

The duct can incorporate one or more functionalities, for example through the addition of specific electromagnetic shielding threads. The sheath incorporates the electromagnetic shielding function, preferably by associating with at least one metal thread incorporated in the (knitted) structure of the sheath.

The threads of the sheath for example have a diameter of between 0.1 and 0.4 mm. These dimensions are in no way limiting.

Another object of the invention, not exclusively, is to propose a flexible conduit which nevertheless gives access to its interior over its length.

The invention also proposes a sheath with a small bending radius that can be obtained with twisting.

The nonlimiting and non-exclusive object of the present invention is therefore to propose a conduit intended to house electric wires, cables and other slender objects.

Finally, the invention relates to a method for implementing the sheath of the invention, comprising at least one step of manual compression in the longitudinal direction of the sheath without tools so as to locally compress the sheath in at least one or more places.

BRIEF DESCRIPTION OF THE SEVERAL VIEWS OF THE DRAWING(S)

Other objects, features and advantages of the present invention will emerge from the following description with the aid of purely illustrative and nonlimiting examples of the scope of the invention, and from the attached illustrations, in which:

FIG. 1 is a perspective view of a sheath of the invention in deployed position;

FIG. 2 is a view of the sheath of FIG. 1 showing a localized portion in the compressed state;

FIG. 3 is a view of the sheath of FIG. 2 arranged bent in the compressed portion;

FIG. 4 is a partial schematic and plan view of the body of the sheath in the deployed state;

FIG. 5 is a view of FIG. 4 in the compressed state;

FIG. 6 is a partial plan view of the sheath on a longitudinal edge thereof.

DETAILED DESCRIPTION OF THE INVENTION

The sheath 1 of the invention schematically illustrated in FIGS. 1 to 4 is a sheath providing mechanical protection, in particular against abrasion, and/or electrical protection, combining the draining function if necessary.

It is intended to receive bundles of electrical wires or cables, although it can house other objects, in particular slender objects.

The protective sheath 1 is of cylindrical form with circular or other section. It has a longitudinal body of axis X.

The sheath 1 is slit longitudinally and is closed on itself, one of the longitudinal edges 10 being folded over and beyond the opposite longitudinal edge 11. This so-called self-closing sheath facilitates the mounting thereof around cables, all the more so when the cables are already installed. It also facilitates the repair, the removal of cables already installed inside the sheath or the addition of cables. It is possible to access the cables anywhere along the sheath.

The mounting of the sheath is done by separating the longitudinal edges 10 and 11 in order to open it and make is possible to arrange it around cables. By releasing the edges, the sheath closes automatically by overlapping of the edges 10 and 11.

The diameter of the sheath and the portion of overlap of the edges are adapted to the size of the bundle of cables to be protected.

The sheath 1 is presented in its deployed state in FIG. 1, while it is in the locally compressed state in FIG. 2. The sheath is in fact capable of being compressed.

The body of the sheath is openwork. It is made of a structure composed of knitted threads forming a multitude of meshes 12. The meshes constitute holes passing through the body of the sheath.

In the compressed state, the sheath 1 has a shorter length since a part of it is compacted on itself.

The sheath can be bent as illustrated in FIG. 3 so that, at the bend, the sheath does not risk being opened, the bunching of material occurring on the inner radius of the bend.

The sheath comprises a multiplicity of meshes 12 which are capable of being entangled in one another when a longitudinal pushing force, for example by a hand, is exerted on one side of the part of the sheath to be compressed while, on the other side, the sheath is held fixed by the other hand.

The sheath comprises at least two threads, namely, at least one thread 2, called framework thread, extending in the longitudinal direction of the sheath, and at least one other thread 3, called transverse thread, extending transversely to the longitudinal direction in the form of a plurality of lines 30 spaced apart from one another (FIG. 1) when the sheath is not in a compressed state, and brought closer together or even made contiguous (FIG. 2) when the sheath is in the compressed state.

The framework 2 and transverse 3 threads are knitted together to obtain the meshed structure of the sheath of the invention.

The framework 2 and transverse 3 threads are made of plastic material, for example of polyamide.

Referring to FIG. 4, the framework thread 2 extends in the longitudinal direction of the sheath along the axis X. It has a form with several sinusoids spaced one after the other in the lengthwise direction, here two sinusoids 20 and 21 being represented.

Each sinusoid 20, 21 extends over the width of the sheath, from one longitudinal edge to the other, and transversely to the longitudinal direction, the amplitude A of the sinusoid extending in the longitudinal direction of the sheath.

The transverse thread 3 describes a plurality of lines 30, here three lines 30A to 30C being illustrated, parallel to and spaced apart from one another, each line extending widthwise to the sheath, that is to say transversely to the longitudinal axis X.

The transverse thread 3 is formed by a multitude of knitted loops 31, the preferred pattern of which is for example a pillar stitch.

The cooperation of the framework thread 2 with the loops 31 and the spacing of the lines 30 of the loops provide the multiplicity of meshes 12.

The framework thread 2 cooperates with the transverse thread 3 so that at least two sinusoids 20 and 21 which follow one another are associated with a common line 30B of the transverse thread 3, as illustrated in FIG. 4.

The framework thread 2 passes through the loops 31 of the transverse thread 3.

The loops are sufficiently loose for the lines 30A to 30C, more particularly the loops 31, to be able to slide along the sinusoids 20, 21 of the framework thread 2.

In the illustrated example of association of the transverse thread 3 with the framework thread 2, the first sinusoid 20 cooperates with two consecutive lines 30A and 30B, and the second sinusoid 21 cooperates with two consecutive lines 30B and 30C. As a variant, the framework thread could cooperate with two lines which are not consecutive to one another.

The transverse thread 3 therefore forms repeated patterns such as pillar stitches 31. The framework thread 2 is associated (knitted) with the transverse thread 3 by running in the pillar stitches 31, and so as to form the sinusoids 20, 21, a single sinusoid linking two spaced-apart transverse lines, respectively 30A and 30B, 30B and 30C.

Thus, two transverse lines, here adjacent 30A and 30B then 30B and 30C (FIG. 4), are linked to be separated only by unitary meshes 12A, respectively 12B, arranged alongside one another in the transverse direction (corresponding to a sinusoid). Each unitary mesh, for example 12A, is obtained by the fact that the framework thread 2 has only a single sinusoid between two transverse lines of the transverse thread 2, the opposing crests of a sinusoid (for example C1 and C2 in FIG. 4) being linked to the two spaced-apart transverse lines (such as 30A and 30B). This uniqueness of meshes separating two transverse lines makes it possible for each mesh 12A to slide from one side of a transverse line into the next aligned mesh 12B situated on the other side of said transverse line, which culminates in the entanglement of FIG. 5.

Thus, when a pushing force is exerted on the sheath, the lines 30A to 30C slide over the transverse thread 2 and are brought closer together, whereas the facing parts of the two sinusoids 20 and 21 and the next ones slide one into the other, as illustrated in FIG. 5.

A compressed part of the sheath is thus obtained when several consecutive lines 30A to 30C are abutted with one another. The meshes 12 of the sheath then have smaller dimensions.

Advantageously, the framework thread 2, has (FIG. 6) on a longitudinal edge of the sheath, the one arranged on the outside, here the edge 11, an outward-extending end 13 on which it is possible to pull in order to fix the compression of the material locally. By pulling on the thread, that tightens the loops of two consecutive lines 30A and 30B of the transverse thread 3 and pinches the framework thread 2 at that point. In this compressed state, the sheath can no longer be deployed at that point.

Consequently, the sheath of the invention is capable of being compressed at any desired point in the longitudinal direction and over any length. It can keep a compressed form permanently or not, the compressed form being able to be fixed by pulling on a transverse thread.

The invention claimed is:
1. A protective sheath comprising a flexible body having, generally, the form of a cylinder, the flexible body being slit along at least a certain length and along a longitudinal axis, characterized in that:
the body has an openwork wall and in that the sheath is capable of being deformed along its length to be compressed/compacted on itself, and the sheath comprises at least two threads, at least one thread, called framework thread, extending in the longitudinal direction of the sheath, having a profile substantially in the form of a plurality of sinusoids, the sinusoids extending transversely in the longitudinal direction, and at least one other thread, called transverse thread, extending transversely in the longitudinal direction in the form of a plurality of lines transversal to the longitudinal axis of the sheath and spaced apart from one another when the sheath is not in a compressed state.

2. The sheath as claimed in claim 1, characterized in that it is capable of retaining its compressed state in the presence of added support means.

3. The protective sheath as claimed in claim 1, characterized in that after having been compressed, it is capable of regaining its initial length or of being brought to an intermediate length while retaining a compressed state to correspond to the desired length.

4. The sheath as claimed in claim 1, characterized in that it is capable of being fixed in its compressed state.

5. The sheath as claimed in claim 1, characterized in that it comprises a multiplicity of meshes/orifices which can be modulated lengthwise parallel to the longitudinal body of the sheath, in particular the modularity of the size of the meshes being obtained by compression or traction of the sheath in the longitudinal direction of its body, in particular manually without tools.

6. The sheath as claimed in claim 1, characterized in that it is made from knitted threads.

7. The sheath as claimed in claim 1, characterized in that the transverse thread comprises patterns or loops, preferably in pillar stitch pattern, in which the framework thread runs, the cooperation of the framework thread with the patterns of the transverse thread and the spacing of the transverse lines of the transverse thread provide a multiplicity of meshes, the framework thread being able to be held in two consecutive or non-consecutive patterns of one and the same line of patterns formed by the transverse thread.

8. The sheath as claimed in claim 1, characterized in that the framework thread forms, with two transverse lines of the transverse thread, a single sinusoid creating unitary meshes between said two transverse lines, the unitary meshes being arranged alongside one another in the direction transversal to the longitudinal direction of the sheath.

9. The sheath as claimed in claim 1, characterized in that the meshes which are aligned in the longitudinal direction of the sheath are capable of sliding longitudinally to be nested in one another.

10. The sheath as claimed in claim 1, characterized in that it incorporates the electromagnetic shielding function, preferably by associating with it at least one metal thread incorporated in the structure of the sheath.

11. A method for implementing the sheath as claimed in claim 1, comprising at least one step of manual compression in the longitudinal direction of the sheath without tools so as to locally compress the sheath in at least one or more places.

\* \* \* \* \*